June 17, 1969  J. A. LUKSCH ET AL  3,450,987
MULTIPLE MODE R.F. MEASUREMENT APPARATUS USING SWEEP AND
COMPARISON TECHNIQUES
Filed June 27, 1966
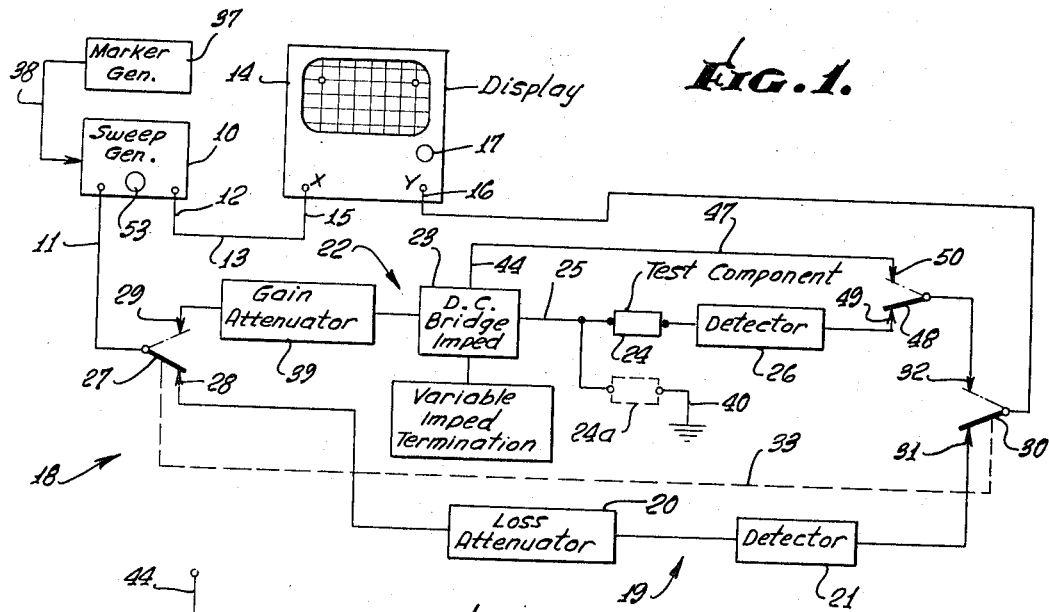
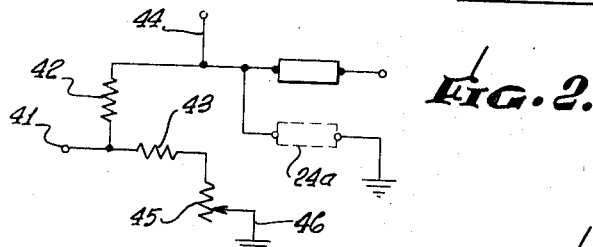
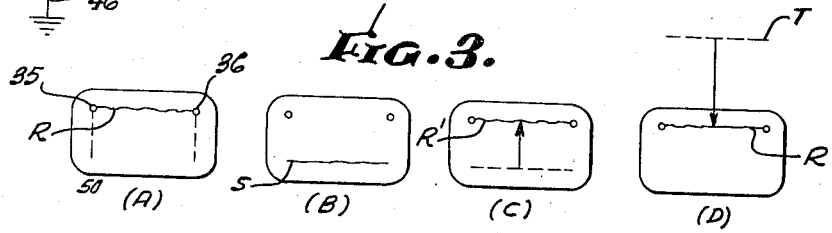
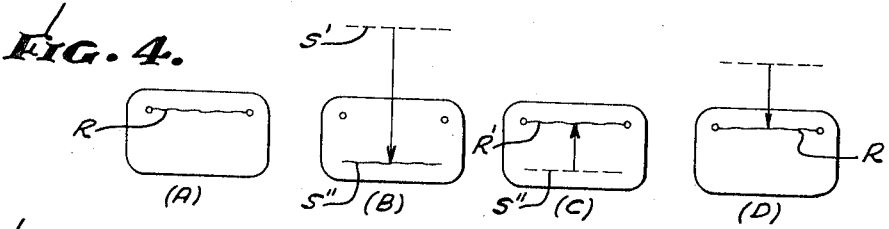
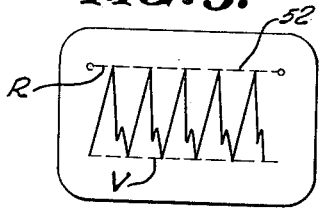
INVENTORS.
JAMES A. LUKSCH
LAWRENCE C. DOLAN
ROBERT A. BROOKS
ARIE ZIMMERMAN
By White & Haefliger
ATTORNEYS.

United States Patent Office 3,450,987
Patented June 17, 1969

3,450,987
MULTIPLE MODE R.F. MEASUREMENT APPARATUS USING SWEEP AND COMPARISON TECHNIQUES
James A. Luksch and Lawrence C. Dolan, Indianapolis, Ind., and Robert A. Brooks, Sycamore, and Arie Zimmerman, De Kalb, Ill., assignors, by mesne assignments, to Anaconda Electronics Company, Anaheim, Calif., a corporation of Delaware
Filed June 27, 1966, Ser. No. 560,778
Int. Cl. G01r 27/02
U.S. Cl. 324—57    9 Claims

ABSTRACT OF THE DISCLOSURE

A gain attenuation and return loss measurement system for visually indicating changes in cable television systems. The system includes a sweep frequency generator alternately connectable to an oscilloscope having an adjustable gain through a first branch having a variable attenuator to set the trace of the display to a first level and through a second branch having an impedance bridge to which an electrical component under test is connectable to set the trace of the display to a second level, whereby the oscilloscope gain is then adjustable to shift the display trace from said second level to said first level, after which the variable attenuator is adjustable to again shift the display trace to said first level, the amount of attenuator adjustment corresponding to the amount of signal attenuation characteristic of said component.

---

This invention relates generally to electronic testing equipment and more particularly concerns application of sweep frequency testing to perform gain, attenuation and return loss measurement in cable television systems.

The recognized advantages of sweep frequency testing techniques in obtaining the above-mentioned measurements are offset by certain disadvantages. The latter include introduction of error due to necessity for use of jumper cables, excessively complex set-up and test procedures that must be followed in the field to obtain desired measurements leading to undesirable expense and loss of time, as well as other disadvantages which are overcome by means of the invention.

It is a major object of the present invention to provide improved analyser apparatus obviating the above disadvantages and offering a considerable number of additional advantages, as will appear. The improved analyser apparatus is typically packaged as a unit and basically comprises a sweep frequency generator, an oscilloscope display having X and Y axis input terminals and also having adjustable gain, the generator having a deflection signal output electrically connected with one of the display input terminals, and a particularly advantageous network electrically connectible between the generator sweep frequency output and the other input terminal of the oscilloscope. That network includes a first branch having a variable attenuator, and a second branch including an impedance bridge to which an electrical component under test is connectible. The network also includes switch means which for less measurement has a first position in which the variable attenuator in the first branch is operable to transmit the generator frequency output to set the trace of the display to a first or reference level, and a second position in which the second branch is operable to transmit the generator frequency output to set the trace of the display to a first or reference level, and a second position in which the second branch is operable to transmit the generator frequency output to set the trace of the display to a second level, the component under test being connected in series between the bridge output and the oscilloscope. The oscilloscope gain is then adjustable to shift the display trace from the second level to the first level, after which the switch means is again movable to first position to permit read-out adjustment of the variable attenuator to again shift the display trace to its first or reference level, and the amount of that read-out adjustment then corresponds to the amount of signal attenuation characteristic of the component under test. In addition, the second branch of the network typically includes another variable attenuator operable to adjust the level of the generator input signal to the bridge, for purposes as will appear, and both branches typically include detectors at the output sides of the first branch attenuator and of the bridge.

It is another object of the invention to provide for use of the same basic analyser to obtain measurements of return losses, i.e. losses due to signal reflections from the component under test. For this purpose, the first network typically includes a shunt connection from the bridge to the other input terminal of the oscillator for applying sweep R.F. to that other terminal when the switch means is in second position, so as to display R.F. trace peaks associated with return loss of the signal tranmitted by the test component. In this regard, the test component is typically terminated during the return loss measurement, as will be described. The oscilloscope gain is at this time adjustable to shift the trace peaks to the first or reference level, and the switch means is thereafter shiftable to first position to enable read-out adjustment of the variable attenuator in the first branch to gain shift the peaks to first level. Such read-out adjustment then corresponds to the amount of return loss to be measured.

Other objects and advantages of the invention include the provision at the bridge of a variable impedance termination operable to adjust the lower level of the trace when measuring return loss so that peak level can be read relative to that lower level, and the provision of a generator control to adjust the number of trace displays presented per second, thereby to obtain invariance of the trace peak level, indicating elimination of error arising due to narrow bandwith.

Further advantages afforded by the invention include the facilitation of simplified test techniques, elimination of jumper cables, the realization of sweep or R.F. characteristics minimizing frequency tilt, improved flatness of the display trace and more accurate interpolation, significant reduction or elimination of error due to wide signal bandwidth, improved resolution, variable input amplitude for use in amplifier testing, capability to accurately calibrate at most commonly used loss and gain levels, and direct digital read-out of all measurements.

These and other objects and advantages of the invention, as well as the details of illustrative embodiments, will be more fully understood from the following detailed description of the drawings, in which:

FIG. 1 is a block diagram of the analyser apparatus;
FIG. 2 is a bridge circuit useable in the FIG. 1 diagram;
FIGS. 3a through 3d are display trace illustrations;
FIGS. 4a through 4d are display trace illustrations; and
FIG. 5 is another display trace illustration.

Referring first to FIG. 1 the apparatus includes a sweep frequency generator 10 having a sweep frequency output at 11 and a deflection signal output 12. The latter is connected at 13 with one of the display input terminals of an oscilloscope 14. The latter has X and Y axis input terminals at 15 and 16, and the connection 13 is shown running to the X axis terminal 15. In this regard, the deflection signal output of the generator 10 may consist of a triangular wave for linear deflection. The oscilloscope 14 is also shown as having a gain adjustment 17, other appropriate controls for the oscilloscope not being shown inasmuch as they are conventional.

The apparatus of FIG. 1 also includes a test network generally indicated at 18, and electrically connectible between the generator output at 11 and the other input terminal of the oscilloscope 14, that other terminal being shown as the Y axis input terminal. The network 18 includes a first branch 19 incorporating a variable attenuator indicated as a loss attenuator 20. Branch 19 also may incorporate a detector 21, or the detector may be located closer to or at the oscilloscope. The network additionally includes a second branch 22 incorporating an impedance bridge 23 to which an electrical component under test is connectible as indicated by the solid lines 24 showing the component connected between the output terminal 25 of the bridge and the oscilloscope. The branch 22 may also incorporate a detector 26, or that detector may be located closer to the oscilloscope.

The network 18 also includes switch means having a first position in which the variable attenuator 20 is operable to transmit the generator frequency output to set the trace of the display to a first level indicated at R in FIG. 3a, the switch means having a second position in which the second branch 22 of the network is operable to transmit the generator frequency output to set the trace of the display to a second level indicated as S in FIG. 3b. Such switch means may for example include the switch arm 27 movable between contacts 28 and 29, and the switch arm 30 movable between the contacts 31 and 32. The two arms are indicated at 33 as being ganged together so as to alternately connect the first and second branches 19 and 22 between the generator 10 and the oscilloscope.

Referring to FIG. 3, after the trace has been established at the level S, as seen in FIG. 3b, it is shifted up to the level R' seen in FIG. 3c as by adjustment of the oscilloscope gain at 17. Thereafter the switch means is again movable to first position as seen in solid lines in FIG. 1, the display trace then typically moving off the scope display as to a position T seen in FIG. 3d. Thereafter, the variable attenuator 20 is adjusted to shift the trace down to the reference level R. As a result, the amount of read-out adjustment of the attenuator 20 corresponds to the amount of signal attenuation characteristic of the test component 24, the latter for example comprising coaxial cable as useable in cable television systems. What has been said pertains to measurement of loss in the cable over a frequency band corresponding to the television channel frequencies. The latter for channels 2 through 13 vary between about 50 megacycles and 220 megacycles indicated in FIG. 3a. Marks 35 and 36 on the display corresponding to the 50 and 220 megacycle limits may be established by a marker generator indicated at 37 in FIG. 1. The latter has input connection at 38 to the sweep generator.

The second branch 22 of the network also typically includes another variable attenuator indicated as gain attenuator 39, operable to adjust the level of the generator input signal to the bridge 23. In this regard, reference is made to FIG. 4a showing the trace level R established when the first branch 19 is connected by the switch means between the generator 10 and the oscilloscope 14. In the event the test component should have R.F. gain instead of loss, the trace indicated at S' would go off the display as seen in FIG. 4b at such time as the branch 22 was connected by the switch means between the generator and the oscilloscope. The gain attenuator 39 may then be adjusted to drop the trace level S' to a level S'' as seen in FIG. 4b. Thereafter, the gain of the oscilloscope may be adjusted to raise the level S'' to the reference level R' equal to the level R, as seen in FIG. 4c.

Finally, the switch means is operated to connect the first branch 19 between the generator and the oscilloscope, and the loss attenuator 20 is adjusted to bring the trace level to the reference level R as seen in FIG. 4d. The amount of read-out adjustment of the loss attenuator, with reference to the gain attenuator 39, corresponds to the amount of gain characteristic of the component 24. As a result, the gain of that component may be very quickly and simply determined through use of the equipment.

The apparatus also enables determination of so-called return loss which is the loss of signal resulting from reflections of the signal at points defined by the construction of the test component. For this purpose, the test component, as for example co-axial cable or other apparatus, is connected in the position indicated in 24a in FIG. 1, whereby it is terminated at 40. The same arrangement is indicated in FIG. 2 where the construction of a DC bridge is indicated in greater detail. The bridge has an input at 41 and includes resistance legs 42 and 43. Bridge output is taken at terminal 44 to which the component under test is connected. In addition, a variable impedance termination is associated with the bridge and typically takes the form of a variable resistance 45 grounded at 46.

The bridge output at 44 is transmitted over a shunt connection at 47 to the input terminal 16 of the oscilloscope for applying sweep R.F. to that terminal when the switch means is in its second position, i.e., with switch arm 27 and 30 engaging contacts 29 and 32 respectively. In this regard, the shunt connection is effected by moving another switch arm 48 from engagement with contact 49 to engagement with contact 50. R.F. trace peaks associated with return loss of the signal transmitted by the terminated test component are therefore displayed at the oscilloscope screen as indicated in FIG. 5. In this regard, the oscilloscope gain is then adjustable to shift the peaks to the reference level R as seen in FIG. 5. Thereafter, the switch means 27 and 30 are movable to first position to enable read-out adjustment of the variable attenuator 20 to shift the peaks 52 (now displaced from level R) back to the level R, and the amount of the adjustment of attenuator 20 then corresponds to the amount of return loss. In this regard, the attenuators 20 and 39 may be appropriately calibrated to indicate loss or gain in db.

The variable impedance termination 45 is adjustable to move the lower level V of the R.F. trace seen in FIG. 5 to a position such that the peak level R can be read relative to the level V.

Finally, the sweep generator 10 has a control at 53 to adjust the number of trace displays presented per second at the oscilloscope screen. Thus, the number of displays may be varied from 60 per second until the peaks do not shift in response to adjustment of the control 53, indicating elimination of error due to bandwidth mismatch between the bridge and oscilloscope circuits.

Merely as illustrative, certain elements of FIG. 1 may have circuit construction similar to the following commercial items of equipment:

| Element: | Item |
| --- | --- |
| 10 | Texscan VS–40. |
| 14 | Texscan DU 88 M. |
| 23 | Texscan RC 13–3. |
| 20 | Texscan RA 74. |
| 39 | Texscan RA 74. |
| 21 | Texscan CD–75. |
| 26 | Texscan CD–75. |

We claim:

1. Analyser apparatus of the character described, comprising a sweep frequency generator having a sweep frequency output, an oscilloscope display having X and Y axis input terminals and also having adjustable gain means, the generator having a deflection signal output electrically connected with one of the display input terminals, and a test network electrically connectable between the generator sweep frequency output and the other input terminal of the oscilloscope, said network including (a) a first branch including a variable attenuator, (b) a second branch including a variable impedance bridge to which an electrical component under test is connectible, and (c) switch means having a first position in which said second branch is electrically disconnected from said generator and said variable attenuator in the first branch is operable to transmit the generator frequency output to set the trace of the display to a first level, and a second position in which said first branch is electrically disconnected from the generator and said second branch is operable to transmit the generator frequency output to set the trace of the display to a second level, whereby the oscilloscope gain is then adjustable by said gain means to shift the display trace from said second level to said first level after which the switch means is again movable to said first position to permit read-out adjustment of the variable attenuator to again shift the display trace to said first level, the amount of said read-out adjustment corresponding to the amount of signal attenuation characteristic of said component.

2. Analyser apparatus as defined in claim 1 in which the second branch includes another variable attenuator operable to adjust the level of the generator input signal to the bridge.

3. Analyser apparatus as defined in claim 1 in which said branches include detectors respectively at the output sides of said first branch attenuator and said bridge.

4. Analyser apparatus as defined in claim 3 in which said network includes a shunt connection from the bridge to said other input terminal of the oscilloscope for applying sweep R.F. to said other terminal when said switch means is in said second position, thereby to display R.F. trace peaks associated with return loss of the signal transmitted by the test component, the oscilloscope gain then being adjustable to shift said peaks to said first level, and the switch means thereafter being movable to said first position to enable read-out adjustment of the variable attenuator to again shift said peaks to said first level, the amount of said read-out adjustment corresponding to the amount of said return loss.

5. Analyser apparatus as defined in claim 4 in which said bridge is a resistance bridge and includes a variable resistance termination.

6. Analyser apparatus as defined in claim 4 in which said generator has a control to adjust the number of trace displays presented per second.

7. In the method of operating analyser apparatus of the character described, comprising a sweep frequency generator having a sweep frequency output, an oscilloscope having X and Y axis input terminals and also having adjustable gain means, the generator having a deflection signal output electrically connected with one of the display input terminals, and a test network electrically connectable between the generator sweep frequency output and the other input terminal of the oscilloscope, said network including (a) a first branch including a variable attenuator, (b) a second branch including a variable impedance bridge to which an electrical component under test is connected, and (c) switch means having a first position in which said second branch is electrically disconnected from said generator and said variable attenuator on the first branch is operable to transmit the generator frequency output to set the trace of the display to a first level, and a second position in which said first branch is electrically disconnected from the generator and said second branch is operable to transmit the generator frequency output to set the trace of the display to a second level, said method including:

(i) operating said switch means from said first to said second positions to establish said first and second levels associated with display trace peaks, (ii) adjusting said gain means to shift the display trace from said second level to said first level, (iii) operating said switch means from said second to said first positions, and (iv) adjusting the variable attenuator to again shift the display trace to said first level whereby the amount of said adjustment of the variable attenuator gives an indication of the amount of signal attenuation characteristic of said component.

8. The method of claim 7 wherein the second branch includes another variable attenuator and including the step, before step (ii), of adjusting said other variable attenuator to establish said second level on the oscilloscope.

9. The method of claim 7 including the step of adjusting said variable impedance to adjust the lower level of the display trace relative to said first level.

References Cited

UNITED STATES PATENTS 2,649,570   8/1953   Radcliffe _____ 324—57
3,210,656   10/1965   Lent _____ 324—57

RUDOLPH V. ROLINEC, *Primary Examiner.*

E. E. KUBASIEWICZ, *Assistant Examiner.*

U.S. Cl. X.R.

324—121